Patented Apr. 13, 1937

2,077,042

UNITED STATES PATENT OFFICE 2,077,042

METHOD OF MAKING ETHERS

Alfred W. Francis, Woodbury, N. J., assignor to Socony-Vacuum Oil Company, Incorporated, New York, N. Y., a corporation of New York No Drawing. Application October 20, 1934, Serial No. 749,279

9 Claims. (Cl. 260—151)

This invention relates to the manufacture of ethers, whether simple or mixed, and the object of the invention is to provide a process by which propylene and other homologues of ethylene may be economically utilized as raw materials for such manufacture.

I have discovered that the homologues of ethylene which are capable of hydration to form secondary alcohols, such olefins being known in the art as "secondary base olefins", may be caused, by the catalytic action of concentrated sulfuric acid, to combine directly with alcohols and produce ethers, which will be simple or mixed according as the alcohol used, is, or is not, that which is produced by hydration of the olefin in question. The rate of reaction depends on conditions of pressure and temperature which are preferably so selected as to give an economic rate without excessive side reactions, and the acid catalyst may be used repeatedly or continuously without purification or reconcentration.

A typical reaction, resulting in a simple ether, is that between propylene and isopropanol, which produces diisopropyl ether:

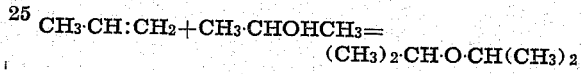

A typical reaction resulting in a mixed ether is that between propylene and ethanol, which produces ethyl isopropyl ether:

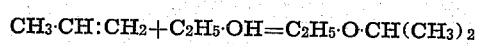

In carrying out the process the sulphuric acid may originally have a concentration of about 95%, and the optimum temperature is in the neighborhood of 90° to 180° C. The higher temperatures give a higher rate of reaction, but tend to the production of undesired products. Elevated pressure, by concentration of the olefin, increases the speed of the reaction, and may be used with advantage up to the vapor pressure of the olefin at the temperature of the reaction, or to its extrapolated pressure when the reaction temperature is above the critical temperature of the olefin. The pressure should, in any case, be not less than the vapor pressure of the alcohol at the temperature used. The reagents should be agitated together or filmed, to increase the surface of contact.

The alcoholysis proceeds most efficiently when the olefin used is in a pure state, but this is not essential. Other gaseous hydrocarbons, such as propane, which do not react with the alcohol may be present without harmful effects other than dilution of the reactive olefins. Where it is desired to produce a particular ether in as pure a state as possible, however, the appropriate olefin should be separated, as far as possible, from other olefins.

The following is an example of the production of a simple ether: 100 parts, by weight, of propylene, 160 parts of isopropanol and 57 parts of 95% sulfuric acid, placed in a closed vessel and heated for 36 hours at a temperature of 100° C., with occasional agitation, the initial pressure being about 300 lbs. gage per square inch, yield 140 parts of diisopropyl ether and 75 parts of unconsumed isopropanol.

By the same process, normal butene and secondary butanol yield di-secondary butyl ether, and pentene and secondary amyl alcohol yield di-secondary amyl ether.

While 100% sulfuric acid is theoretically the most efficient as a catalyst, and the presence of water is not necessary, the use of dilute acid or alcohol in the first instance, results merely in the hydration of part of the olefin into the corresponding alcohol, thus augmenting the quantity of alcohol already intentionally introduced. After the operation on one batch the acid, together with the unconsumed alcohol, may be returned to the vessel for operation on another batch, and the acid, when so used repeatedly, will ultimately attain the degree of concentration consistent with the equilibrium conditions at the completion of the reaction. It is desirable, in all cases, to have the alcohol present in excess of molecular proportion with the olefin, since it constitutes a solvent for the olefin and thus promotes intimate contact of the reagents.

As an example of the production of a mixed ether: 100 parts of propylene, 164 parts of 92% ethanol and 16 parts of 95% sulfuric acid, heated for 4 hours at a temperature of 180° C. under an initial pressure of 570 lbs., yield liquid products which separate into two layers, the upper layer containing 89 parts of ethyl isopropyl ether, 38 parts of diethyl ether and 4 parts of diisopropyl ether. The lower layer, consisting of sulfuric acid and small quantities of alcohol and ether, may be reused in the same process in place of fresh acid.

As another example of the production of a mixed ether: 100 parts of normal butene, (comprising chiefly butene-2), 58 parts of methanol and 52 parts of 95% sulfuric acid, heated 3 hours at a temperature of 90° C., under an initial pressure of about 200 lbs., yield products including 32 parts of methyl secondary butyl ether. The production may be increased by a longer time of reaction.

In the same manner, normal butene and isopropanol yield isopropyl secondary butyl ether, butene and ethanol yield ethyl secondary butyl ether, etc. In working for the production of a mixed ether, minor quantities of simple ethers are produced by the direct action of the acid on the alcohol present and by hydration of a part of the olefin and the combination of the alcohol, so produced, with a further portion of the olefin.

Olefins suitable for use in this process are propylene, butene and pentene, and any primary or secondary alcohol may be used, corresponding to the simple or mixed ether which is desired.

I claim as my invention:

1. The process for manufacturing ether which comprises chemically reacting a secondary base olefin with an alcohol of an order not above secondary by bringing said olefin and said alcohol into intimate contact with each other and with concentrated sulphuric acid at a temperature between approximately 90° C. and 180° C. under a pressure not less than the vapor pressure of the alcohol at the temperature of the reaction, said intimate contact being maintained until not less than about 20% of the olefin is converted to ether and then separating the ether thus formed from the reaction mixture.

2. The process of claim 1, conducted with said alcohol substantially in excess of molecular proportion to the olefin.

3. The process for manufacturing ether which comprises chemically reacting a secondary base olefin with an alcohol of an order not above secondary by bringing said olefin and said alcohol into intimate contact with each other and with concentrated sulphuric acid at a temperature between approximately 90° C. and 180° C. under a pressure not less than the vapor pressure of the alcohol at the temperature of the reaction, said intimate contact being maintained until the reaction reaches substantial equilibrium and then separating the ether thus formed from the reaction mixture.

4. The process for manufacturing ether which comprises chemically reacting propylene with an alcohol of an order not above secondary by bringing said propylene and said alcohol into intimate contact with each other and with concentrated sulphuric acid at a temperature between approximately 90° C. and 180° C. under a pressure not less than the vapor pressure of the alcohol at the temperature of the reaction, said intimate contact being maintained until the reaction reaches substantial equilibrium and then separating the ether thus formed from the reaction mixture.

5. The process for manufacturing ether which comprises chemically reacting propylene with an alcohol of an order not above secondary by bringing said propylene and said alcohol into intimate contact with each other and with concentrated sulphuric acid at a temperature between approximately 90° C. and 180° C. under a pressure not less than the vapor pressure of the alcohol at the temperature of the reaction, said intimate contact being maintained until not less than about 20% of the propylene is converted to ether and then separating the ether thus formed from the reaction mixture.

6. The process for manufacturing a mixed ether which comprises chemically reacting a secondary base olefin with an alcohol of an order not above secondary by bringing said olefin and said alcohol into intimate contact with each other and with concentrated sulphuric acid at a temperature between approximately 90° C. and 180° C. under a pressure not less than the vapor pressure of the alcohol at the temperature of the reaction, said intimate contact being maintained until the reaction reaches substantial equilibrium and then separating the ether thus formed from the reaction mixture, said alcohol having a molecular composition differing from that of the alcohol which corresponds to the said secondary base olefin.

7. The process for manufacturing ether which comprises chemically reacting a secondary base olefin with an alcohol of an order not above secondary by bringing said olefin and said alcohol into intimate contact with each other and with concentrated sulphuric acid at a temperature between approximately 90° C. and 180° C. under a pressure not less than the vapor pressure of the alcohol at the temperature of the reaction, said intimate contact being maintained for between about 3 hours and about 36 hours, and then separating the ether thus formed from the reaction mixture.

8. The process for manufacturing ether which comprises chemically reacting a secondary base olefin with an alcohol of an order not above secondary by bringing said olefin and said alcohol into intimate contact with each other and with concentrated sulphuric acid of a concentration of between about 95% and 100% by weight at a temperature between approximately 90° C. and 180° C. under a pressure not less than the vapor pressure of the alcohol at the temperature of the reaction, said intimate contact being maintained for between about 3 hours and about 36 hours, and then separating the ether thus formed from the reaction mixture.

9. The process for manufacturing ether which comprises chemically reacting butene with an alcohol of an order not above secondary by bringing said butene and said alcohol into intimate contact with each other and with concentrated sulphuric acid at a temperature between approximately 90° C. and 180° C. under a pressure not less than the vapor pressure of the alcohol at the temperature of the reaction, said intimate contact being maintained until not less than about 20% of the butene is converted to ether and then separating the ether thus formed from the reaction mixture.

ALFRED W. FRANCIS.